United States Patent [19]

Peterson et al.

[11] Patent Number: 5,594,940
[45] Date of Patent: Jan. 14, 1997

[54] STATISTICALLY ROBUST TRAFFIC MODELING METHOD AND APPARATUS

[75] Inventors: Kenneth M. Peterson, Phoenix; Victor H. Cutler, Jr., Mesa, both of Ariz.; Gerald J. Davieau, Eldersburg, Md.

[73] Assignee: Motorola, Inc., Schaumburg, Ill.

[21] Appl. No.: 361,402

[22] Filed: Dec. 22, 1994

[51] Int. Cl.$^6$ .......................................... H04Q 7/00
[52] U.S. Cl. .................. 455/12.1; 455/33.1; 455/34.2
[58] Field of Search ..................... 455/3.2, 33.1, 455/34.2, 12.1, 62, 63, 67.1, 89; 370/95.1, 95.3, 97, 75; 364/514 C

[56] References Cited

U.S. PATENT DOCUMENTS

| | | | |
|---|---|---|---|
| 4,831,373 | 5/1989 | Hess | 455/34.1 |
| 5,042,027 | 8/1991 | Takase et al. | 370/60 |
| 5,268,694 | 12/1993 | Jan et al. | 455/63 |
| 5,448,621 | 8/1995 | Knudsen | 370/95.3 |

*Primary Examiner*—Reinhard J. Eisenzopf
*Assistant Examiner*—Marsha D. Banks-Harold
*Attorney, Agent, or Firm*—Sherry J. Whitney; Harold C. McGurk IV

[57] ABSTRACT

A method and apparatus for controlling communication channel access in a communication system (10) determines channel allocations (106) which represent limits on communication channel access and conforms operations of the system (10) to the channel allocations. The channel allocations are determined by dividing a surface which emanates signals from communication units (26) into elemental areas, collecting past traffic data (102) describing past communication channel usage by the communication units (26) located in the elemental areas, generating a traffic model (104) for a future time interval based on the past traffic data, and determining the channel allocations (106) based on the traffic model.

14 Claims, 6 Drawing Sheets

5,594,940

STATISTICALLY ROBUST TRAFFIC MODELING METHOD AND APPARATUS

FIELD OF THE INVENTION

The present invention relates generally to cellular communication systems and, more particularly, to managing cellular communication systems to accommodate communication traffic demand.

BACKGROUND OF THE INVENTION

As defined herein, a "subscriber" is a communication system user. "Subscriber traffic" is defined herein as data originating from one or more communication devices operated by one or more subscribers. The subscriber traffic-carrying capacity of a communications system is limited, because a finite quantity of resources (e.g., electrical energy stored in a satellite battery, or channel capacity of a radio link) exists within any communication system. Correspondingly, the number of subscribers who may access the communication system at one time is also limited. When subscriber traffic exceeds the capacity of the communication system, some subscribers will be denied access. Frequent denial of access is likely to result in unsatisfied subscribers.

In any system with finite resources, management of the system resources is desirable to provide better system performance (e.g., more subscriber traffic-carrying capacity) than if resource management were not performed at all.

Prior art ground-based (non-cellular) communication systems (e.g., a telephone network) generally contain communication nodes (e.g., telephones or radios) utilized by subscribers, a central control facility which manages overall operation of the system, and distribution devices which control subscriber traffic based on instructions from the central control facility. One function of the central control facility may be to control the amount of subscriber traffic through the system. Prior art distribution management may be done in a reactive manner (i.e., the control facility adjusts assignment instructions in real-time by reacting to actual quantities of subscriber traffic), or it may be done in a predictive manner (i.e., the control facility predicts future quantities of subscriber traffic, and instructs distribution devices to control future subscriber traffic based on the prediction).

Prior art ground-based cellular communication systems also contain communication nodes (e.g., cellular telephones), distribution devices, and a central control facility. However, central control facilities for prior art ground-based cellular communications systems do not manage subscriber traffic in a predictive manner. They merely react to subscriber traffic demand in real-time. When subscriber traffic demand exceeds the capacity of the system, users will be denied access to the system.

Non-cellular and cellular distribution devices typically have a fixed set of communication nodes to service. Non-cellular distribution devices service communication nodes that are generally coupled to the specific distribution device through some static transmission medium. Cellular distribution devices service communication nodes that are located within a fixed geographical area within communication range of the particular distribution device.

As communication needs grow, satellite-based cellular communication systems have become a desirable alternative to prior art ground-based non-cellular and cellular communication systems. Unlike prior art ground-based systems, satellite-based communication systems may readily provide world-wide communication coverage. Distribution devices associated with satellite-based cellular communication systems (i.e., satellites) differ from distribution devices of ground-based communication systems in two ways.

First, satellites may not service a fixed quantity of subscribers. For non-geostationary satellites, the satellites move with respect to the surface of the earth. Thus, the geographical area and the number of subscribers seen by a satellite may vary dramatically with the changing location of the satellite.

Second, the resources of satellite cellular distribution devices are highly dynamic. Weight and size constraints limit the quantity of resources each satellite may contain at launch. Additionally, resources are difficult to increase or replenish due to the remoteness of the satellites. Accordingly, each satellite may have a completely different set of rules and constraints from every other satellite, and the overall state of the system may never repeat.

Adequate resource management depends on a robust prediction of subscriber traffic which the satellites will encounter. Such a prediction would allow the communication system to knowledgeably limit subscriber access over a particular region while still providing acceptable service to the region and other geographical areas over which the satellite subsequently passes.

Thus, what is needed is a method and apparatus for predicting subscriber traffic demand for a communication system so that the resources used may be controlled in a manner to allow the system to handle subscriber traffic efficiently. Particularly needed is a system and method for predicting subscriber traffic demand for a satellite cellular communication system containing limited, dynamic resources where subscriber traffic demand varies.

GLOSSARY OF TERMS

"Call Data Record" (CDR) means a record of times of call setup and completion, and subscriber unit location.

"Gateway" (GW) means an equipment facility, typically ground-based, which is capable of interfacing a Gateway Ground Communication Station (GW-GCS) (and thus satellites) with ground-based equipment such as, for example, a public switched telephone network (PSTN).

"Ground Communication Station" (GCS) means a terrestrial communication facility capable of interfacing ground-based equipment (e.g., a Gateway or System Control Segment) with one or more satellites.

"GW-GCS" means a Ground Communication Station (GCS) associated with a Gateway (GW).

"Location Area Code" (LAC) means a value (e.g., a number or letter) which uniquely identifies a particular location area (or region).

"SCS-GCS" means a Ground Communication Station (GCS) associated with a System Control Segment (SCS).

"Subscriber" means a communication system user.

"Subscriber Unit" (SU) means an individual communication terminal which communicates directly with a satellite via a radio link.

"System Control Segment" (SCS) means a control facility, typically ground-based, which controls operation of a communication system.

"System Node" means a satellite, GW, SCS, SCS-GCS, GW-GCS, or other devices which interface with the communication system.

DETAILED DESCRIPTION OF THE DRAWINGS

The present invention provides a statistically robust method and apparatus for predicting subscriber traffic for a communication system. An accurate subscriber traffic prediction method enables a system manager to apply system resources efficiently. Accordingly, areas anticipated to have high demand will desirably be allocated more resources than low-demand areas. If a subscriber traffic prediction is inaccurately high (e.g., a predicted high-demand area actually experiences a low demand), then the excess resources allocated to this area will be under-utilized. Of more immediate concern, if a predicted low-demand area actually experiences high demand, subscribers may be denied access to the system.

Figure 1:
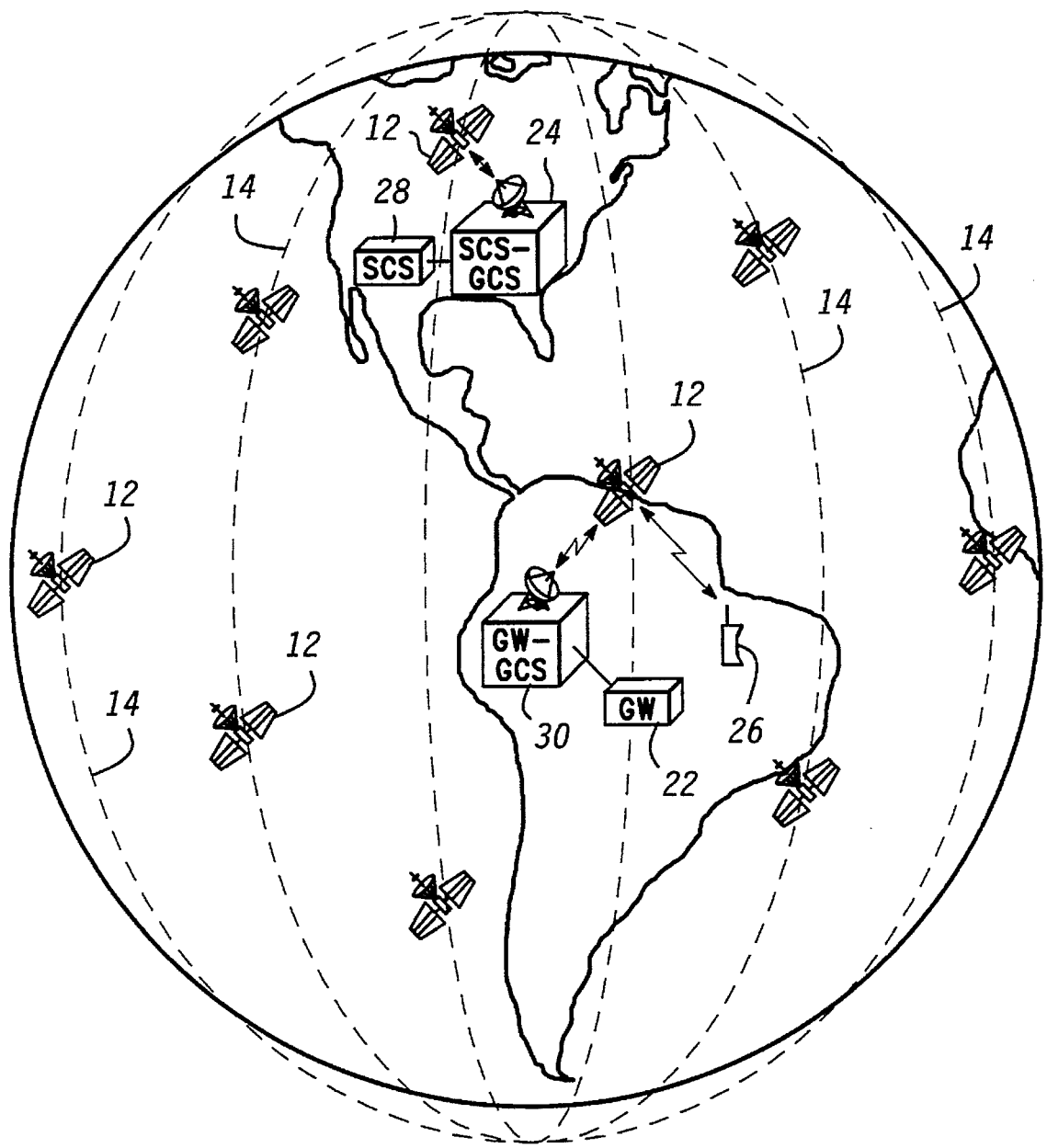
FIG. 1 illustrates a satellite cellular communication system in accordance with a preferred embodiment of the present invention.

FIG. 1 illustrates a satellite-based cellular communication system 10 in accordance with a preferred embodiment of the present invention. Communications system 10 is dispersed over, and surrounding the earth through the use of orbiting satellites 12.

Satellites 12 occupy orbits 14 that may be low-earth orbits, medium-earth orbits, geosynchronous orbits, or a combination thereof. Low-earth orbits occur generally at an altitude of approximately 600 km to 2000 km, medium-earth orbits occur at approximately 2000 km to 20,000 km, and geosynchronous orbits occur at approximately 42,165 km, but other altitudes may also be used. Satellites 12 operate as distribution devices for communication system 10, and communicate with terrestrial equipment which may be any number of radio-communication Subscriber Units 26, System Control Segment Ground Communication Stations 24, or Gateway Ground Communication Stations 30.

The Subscriber Unit 26 (SU) shown in FIG. 1 may be, for example, a hand-held, portable cellular telephone adapted to transmit subscriber data to, and receive subscriber data from satellites 12. An SU 26 may also be a facsimile device, pager, data terminal or any other type of communication device.

A "Ground Communication Station" (GCS) is a terrestrial communication facility capable of interfacing ground-based equipment (e.g., Gateway 22 or System Control Segment 28) with one or more satellites 12. FIG. 1 shows Gateway GCS 30 (GW-GCS) associated with Gateway 22, and System Control Segment GCS 24 (SCS-GCS) associated with System Control Segment 28. SCS-GCSs 24 desirably perform data transfer, and telemetry, tracking, and control functions for the constellation of satellites 12. GW-GCSs 30 desirably perform data transfer between satellites 12, and Gateways 22.

A "Gateway" 22 (GW) is an equipment facility, typically ground-based, which is capable of interfacing GW-GCS 30 (and thus satellites 12) with ground-based equipment such as, for example, a public switched telephone network (PSTN), not shown. GWs 22 desirably perform call processing functions in conjunction with SUs 26, terrestrial telephony equipment (THE) (e.g., PSTN equipment), and satellites 12. GWs 22 communicate with the rest of communication system 10 via GW-GCSs 30. GWs 22 need not be co-located with GW-GCSs 30. GWs 22 are preferably coupled to GW-GCSs 30 via land-lines, although this is not essential. In an alternative embodiment, GWs 22 may be coupled to GW-GCSs 30 via fiber optic links, radio links or other transmission media.

A "System Control Segment" 28 (SCS) is a control facility, typically ground-based, which controls operation of communication system 10. SCS 28 communicates with the rest of communication system 10 via SCS-GCS 24. SCS 28 need not be co-located with SCS-GCS 24. SCS 28 is preferably coupled to SCS-GCS 24 via land-lines, although this is not essential. In an alternative embodiment, SCS 28 may be coupled to SCS-GCS 24 via fiber optic links, radio links or other transmission media.

Only one each of GW 22, SCS 28, SU 26, SCS-GCS 24, and GW-GCS 30 is shown in FIG. 1 for clarity, and ease of understanding. Additionally, only a few of satellites 12 are shown. Those of skill in the an will understand based on the description that more or fewer system nodes may be desirable, depending upon the needs of the communication system.

Figure 2:
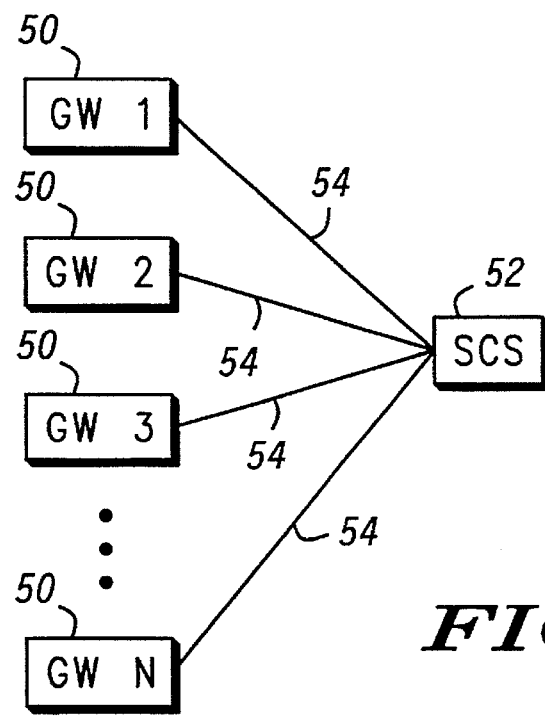
FIG. 2 illustrates a configuration of gateways and a system control segment in accordance with a preferred embodiment of the present invention.
Figure 5:
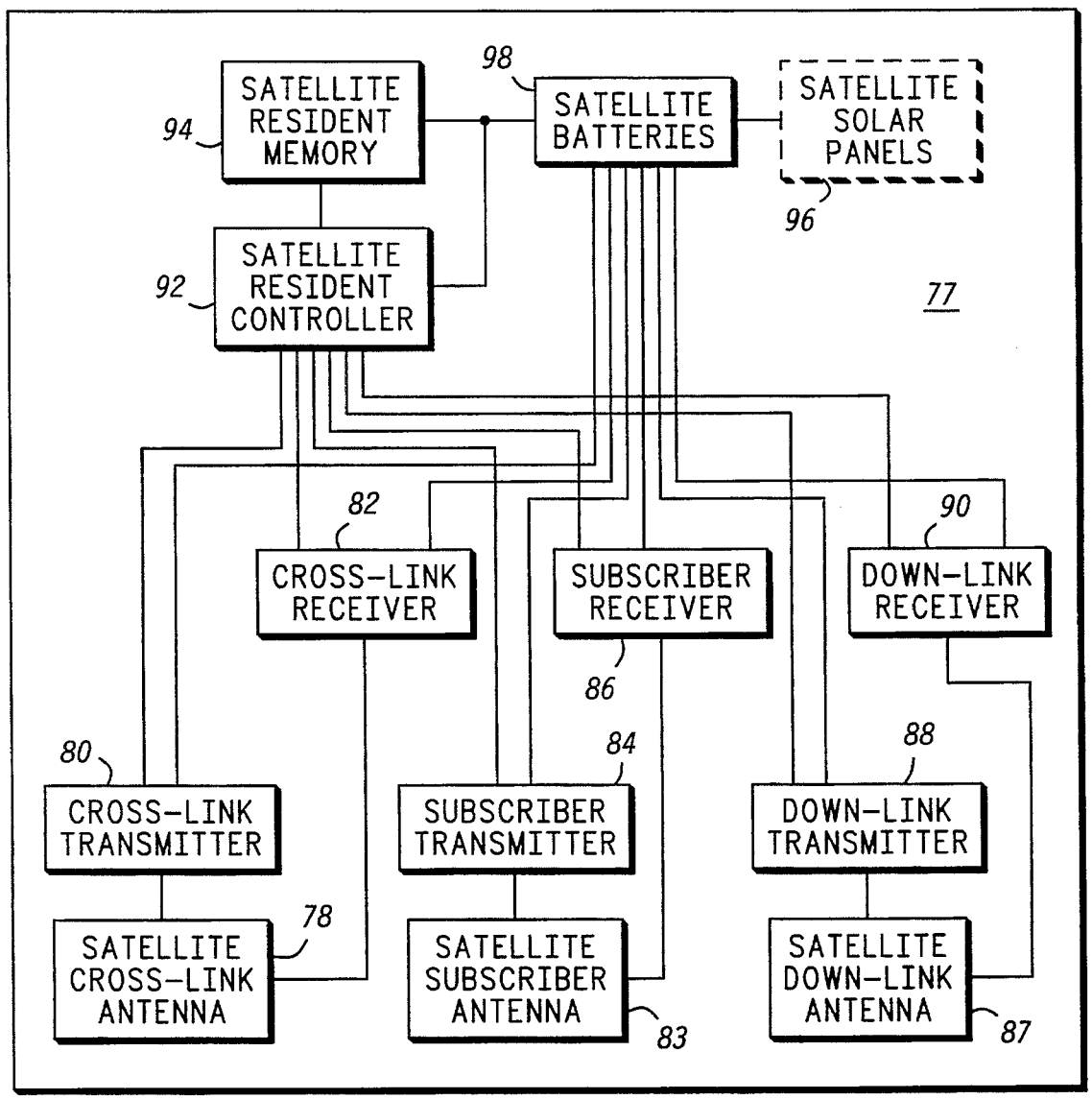
FIG. 5 shows a block diagram of a satellite in accordance with a preferred embodiment of the present invention.

FIG. 2 illustrates a configuration of gateways and a system control segment in accordance with a preferred embodiment of the present invention. In a preferred embodiment, GWs 50 collect traffic data corresponding to subscribers serviced by each GW 50 and transmit the traffic data to SCS 52 over links 54. This information is used by SCS 52 to create a subscriber traffic prediction. In an alternative embodiment, each GW 50 performs calculations necessary to create the subscriber traffic prediction and transmits the result to SCS 52. SCS 52 uses the subscriber traffic prediction to control operations and resource usage by the communication system. Multiple GWs 50 may communicate with SCS 52, as shown by integers 1–n associated with each GW 50. FIG. 5 shows four GWs 50, however more or fewer GWs 50 may be used as would be obvious to one of skill in the art based on the description. Links 54 may be land lines, radio frequency (RF) links, or optical links, for example. Further, links 54 need not be direct links. For example, links 54 may contain one or more satellites (e.g., satellites 12, FIG. 1 ) which relay signals from GWs 50 to SCS 52.

Figure 3:
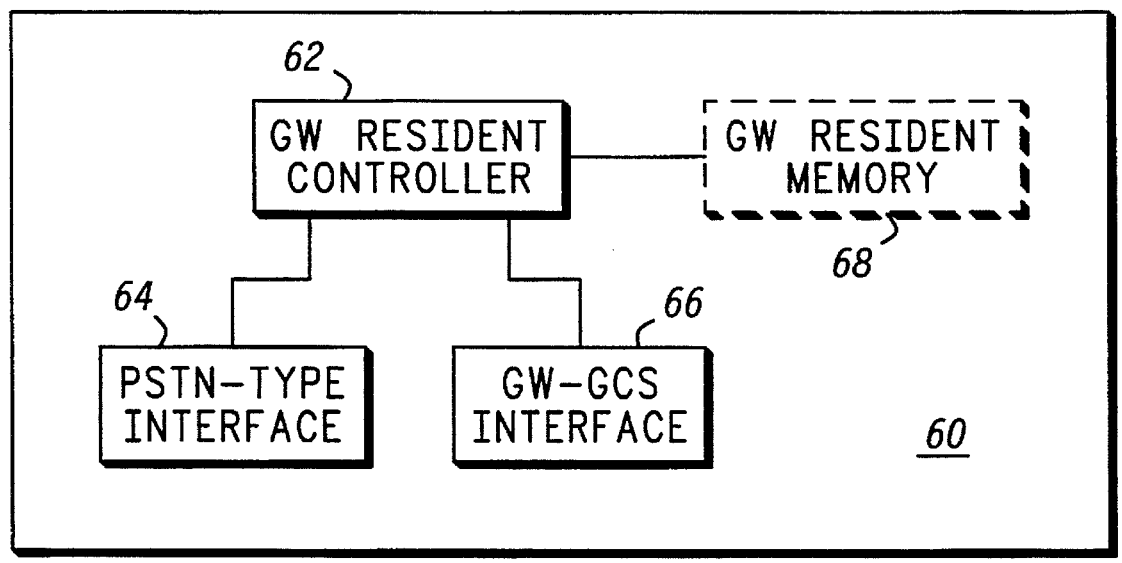
FIG. 3 shows a block diagram of a gateway in accordance with a preferred embodiment of the present invention.

FIG. 3 shows a block diagram of a gateway in accordance with a preferred embodiment of the present invention. GW 60 desirably includes GW resident controller 62 coupled to PSTN-type interface 64. PSTN-type interface 64 may connect GW 60 to a PSTN, an international switching center (ISC), or another network, based on the requirements of the particular communications system. GW resident controller 62 is also coupled to GW-GCS interface 66. GW 60 communicates with the rest of the system via GW-GCS interface 66. In an alternative embodiment, GW 60 may additionally include GW resident memory 68.

Figure 4:
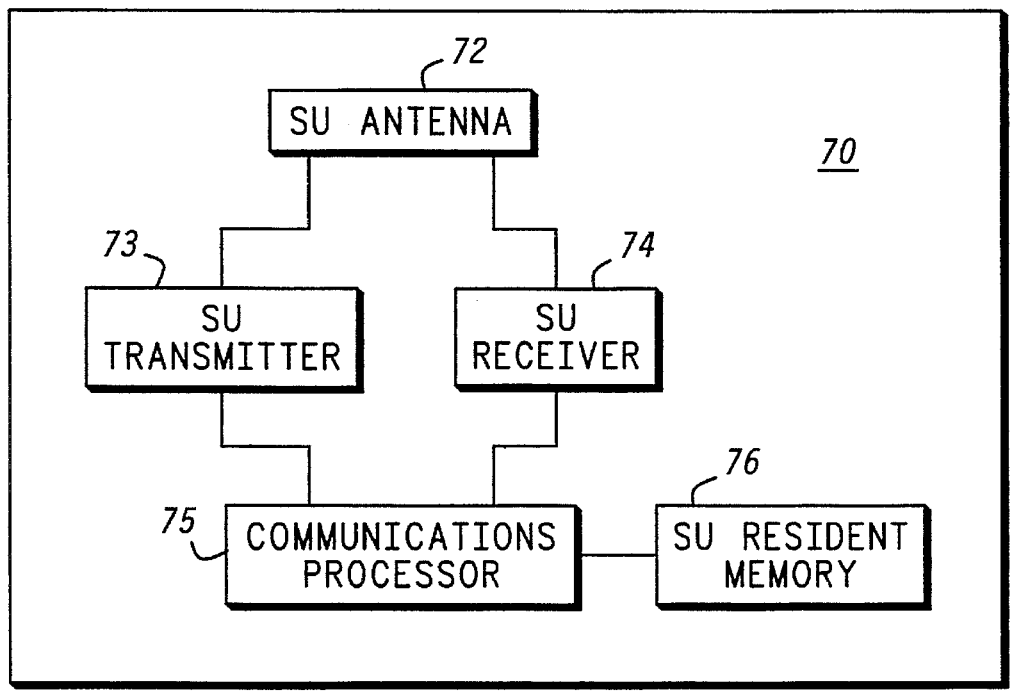
FIG. 4 shows a block diagram of a subscriber unit in accordance with a preferred embodiment of the present invention.

FIG. 4 shows a block diagram of a subscriber unit (SU) in accordance with a preferred embodiment of the present invention. Subscriber unit 70 may be either a stationary or a mobile communications unit. Subscriber unit 70 desirably includes SU antenna 72 coupled to SU transmitter 73, and SU receiver 74, which are in turn coupled to communications processor 75. Subscriber unit 70 transmits, and receives subscriber data, identification information, and system data through SU transmitter 73, and SU receiver 74, respectively.

Communications processor 75 is coupled to SU resident memory 76. Communications processor 75 controls, and manipulates data (e.g., voice data) communicated to, and from subscriber unit 70. Part of the communications processor's control task is to evaluate whether subscriber unit 70 may make a "call" on communication system 10 (FIG. 1), and, if subscriber unit 70 may make a call, what communication channel subscriber unit 70 may use. This evaluation depends on access, and channel information broadcast by a satellite 12 (FIG. 1) which is received by subscriber unit 70 through SU receiver 74.

FIG. 5 shows a block diagram of a satellite in accordance with a preferred embodiment of the present invention. Satellite 77 desirably includes satellite cross-link antenna 78, satellite down-link antenna 87, and satellite subscriber antenna 83. Although only one satellite cross-link antenna 78, satellite down-link antenna 87, and satellite subscriber antenna 83 are shown in FIG. 5, more than one of each type of antenna may exist on board satellite 77, or one or more of the antennas may be combined.

Satellite cross-link antenna 78 is coupled to cross-link transmitter 80, and cross-link receiver 82. Satellite down-link antenna 87 is coupled to down-link transmitter 88, and down-link receiver 90. Transmitters 80, 84, 88, and receivers 82, 86, 90 are coupled to satellite resident controller 92, which is coupled to satellite resident memory 94. Channel allocations are periodically or aperiodically received from SCS 28 (FIG. 1) by satellite 77 through satellite down-link antenna 87, and down-link receiver 90, and are stored in satellite resident memory 94. The allocations are used by the satellite 77 to determine when to allow a subscriber unit 26 to place a call. Satellite subscriber antenna 83 is coupled to subscriber transmitter 84, and subscriber receiver 86. Satellite subscriber antenna 83 projects a "cell pattern" toward the earth. A cell pattern contains one or more directional communication channels. Each channel desirably allows a subscriber unit 26 to communicate with a satellite 77.

Satellite resident controller 92 controls real-time operation of satellite 77. This partially entails regulating subscriber traffic in accordance with the allocations stored in satellite resident memory 94. Satellite resident controller 92 desirably broadcasts access, and channel information to all subscriber units 26 within the satellite's cell pattern. The access, and channel information informs the subscriber units 26 whether or not to attempt to make a call.

Satellite 77 also desirably includes satellite solar panels 96 coupled to satellite batteries 98. Satellite batteries 98 are coupled to, and provide electrical energy to satellite resident memory 94, satellite resident controller 92, transmitters 80, 84, 88, and receivers 82, 86, 90.

Figure 6:
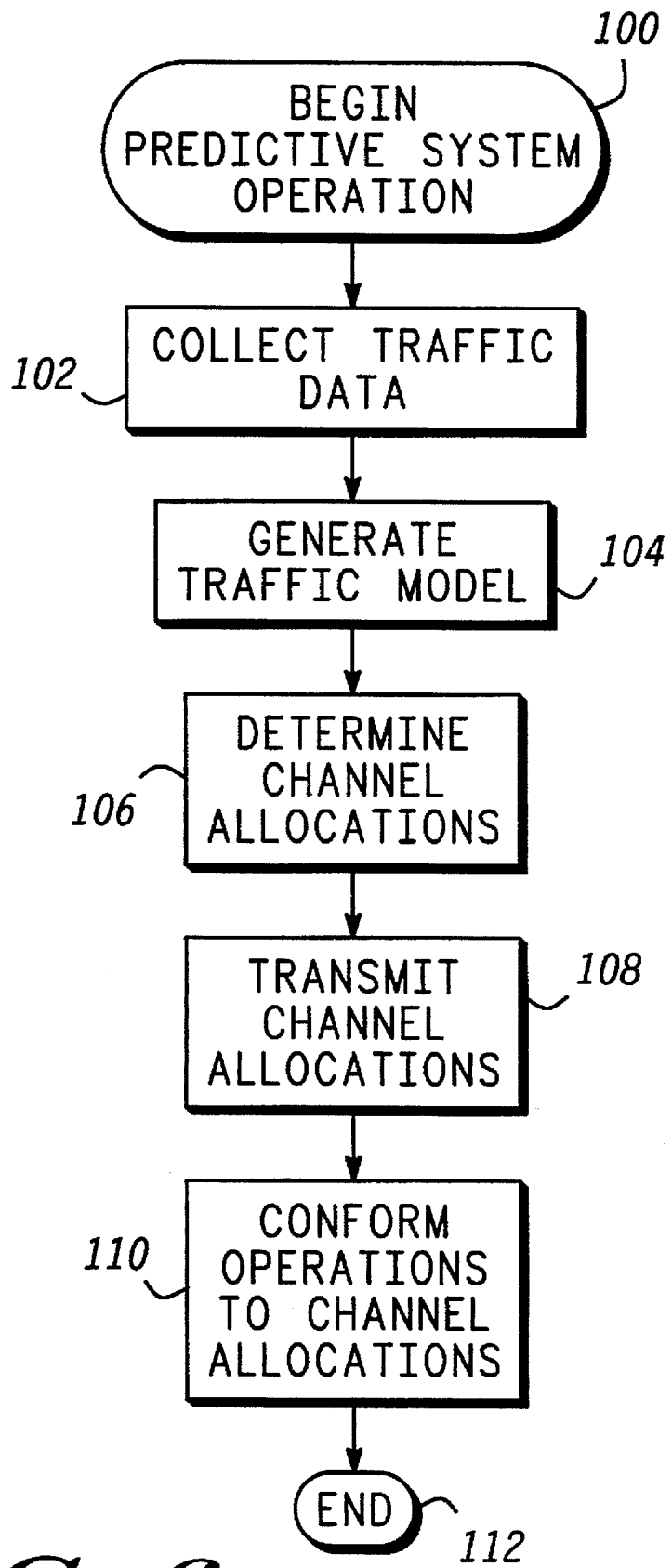
FIG. 6 illustrates a flowchart of a method of operating a communication system based on a traffic prediction in accordance with a preferred embodiment of the present invention.

FIG. 6 illustrates a flowchart of a method of operating a communication system based on a traffic prediction in accordance with a preferred embodiment of the present invention. The predictive system operation process begins in step 100 with the collect traffic data step 102 after the control facility has divided the surface which emanates signals from the subscriber units into a set of elemental areas. The collect traffic data step 102 determines a totality of call attempts during a particular time interval on the surface of the earth. The totality of call attempts includes calls which were successfully connected as well as call attempts that were blocked because a sufficient number of channels were not available. In a preferred embodiment, the totality of call attempts is determined by evaluating Call Data Records (CDRs) which desirably record a call's start time, stop time (or duration), and the location of the subscriber unit at some time during the call. The location of the subscriber unit is desirably determined using geolocation devices accessible to the subscriber unit. Alternatively, the location may be roughly determined based on the cell in which the subscriber unit is located at a particular time. The collect traffic data step 102 is desirably performed in GWs. As would be obvious to one of skill in the art based on the description, the particular method of collecting traffic data is not important. What is important is that data is collected describing a number of successful calls and call attempts during a particular time interval within a particular set of elemental areas.

After the collect traffic data step 102, the generate traffic model process 104 is performed. The generate traffic model process 104 uses the collected traffic data to predict the numbers of users which should access the communication system during future time intervals in particular areas. The predicted numbers are unlikely to be exceeded during system operation. The generate traffic model process 104 is desirably performed in an SCS. However, as would be obvious to one of skill in the art based on the description, some or all of the generate traffic model process 104 may be performed in GWs, satellites, or other facilities. The generate traffic model process 104 is described in detail in connection with FIG. 7.

After a robust model of the traffic has been generated in step 104, channel allocations are determined in step 106. Step 108 then transmits the calculated channel allocations to each satellite. As would be obvious to one of skill in the art based on the description, if cellular devices rather than satellites are used in a system, step 106 would transmit the channel allocations to the appropriate devices.

The satellites then conform operations to the channel allocations in step 110. In a preferred embodiment, a satellite allows subscriber unit access up to the channel allocation, and denies access to subscriber units requesting channels which exceed the channel allocation. In an alternative embodiment, a satellite may transmit an alarm message to a GW or SCS when system usage approaches or exceeds a channel allocation. The procedure exits in step 112.

Figure 7:
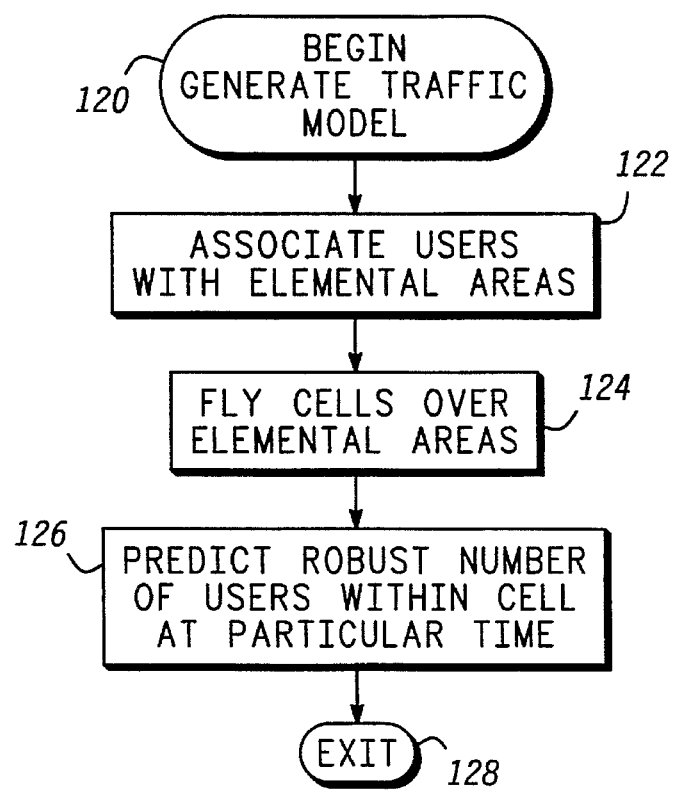
FIG. 7 illustrates a flowchart of a method of generating a traffic model in accordance with a preferred embodiment of the present invention.

FIG. 7 illustrates a flowchart of a method of generating a traffic model in accordance with a preferred embodiment of the present invention. The generate traffic model process begins in step 120 with the associate users with elemental areas step 122. In step 122, a particular cell is described in Eqn. 1 (shown later) as a union of L elemental areas (A1) which represent small areas on the surface of the earth. For example, an elemental area $A_1$ may be 0.5 degrees latitude by 0.5 degrees longitude. Each individual user may be located to an accuracy which allows the user to be allocated to a particular elemental area. For example, the user may be located using a geolocation device or methodology.

As described in connection with FIG. 6, each gateway desirably compiles a listing of the number of users (including both completed and blocked calls) within each elemental area which the gateway services as a function of time of day. With this information, the mean number of users may then be calculated for a periodic or aperiodic time increment. For example, the mean number of users may be calculated on an hourly basis, resulting in an approximation of the usage for each increment each hour. The mean number of users may be calculated by either the gateways, or by the SCS as would be obvious to one of skill in the an based on the description.

The fly cells over elemental areas step 124 is then performed. This step 124 determines the location of a particular cell at a point in time of a future time increment, and associates the cell with the elemental areas which the cell will be servicing at that point in time. In a satellite system where cells travel, the time increment may be some fraction of the time it takes for a cell to travel one cell width.

After step 124, the predict robust number of users within a cell at a particular time step 126 is performed, which generates a statistically robust traffic prediction for each cell. The traffic prediction corresponds to the elemental areas associated with the cell at the future point in time. The traffic prediction is determined as follows. First, the cell area is given by, $$\text{cell area} = \bigcup_{i=1}^{L} A_l \quad \text{(Eqn. 1)}$$

The probability that there will be some amount of calls ongoing in the particular cell (assuming a stationary solution exists) is given by Eqn. 2.

$$P_k^l = \frac{\rho_l^k(t,\theta_l,\phi_l) P_0^l}{k!} \quad k=1,2,\ldots \quad \text{(Eqn. 2)}$$

where $P_k^l$ is the probability that there are k ongoing calls in the area $A_1$, $$\rho_l(t,\theta_l,\phi_l) = \frac{\lambda_l(t,\theta_l,\phi_l)}{\upsilon} \quad \text{(Eqn. 3)}$$

with $\lambda_l(t,\theta_l,\phi_l)$ being the call arrival rate at time of day t and location within an elemental area $\theta_1\phi_l$, and $\upsilon$ is the service rate (rate at which channels are used).

If X is a random variable denoting the number of calls in progress in the cell area defined in Eqn. 1, then $$X = \sum_{l=1}^{L} X_l \quad \text{(Eqn. 4)}$$

where $X_1$ is a random variable denoting the number of ongoing calls in area $A_1$. Since the $X_1$ are independent Poisson distributed variables, X is also Poisson distributed.

Thus, X is Poisson distributed with paramenter $$\sum_{l=1}^{L} \rho_l.$$

The mean and standard deviation for such a process is well known. Thus, $$\bar{x} = \sum_{l=1}^{L} \rho_l \text{ and } \sigma_x = \sqrt{\sum_{l=1}^{L} \rho_l}$$

Step 126 predicts a robust number of users within a cell at a particular time by using the mean and variance as a function of time of day, t. The robust number of users (i.e., the allocation) $K_{ij}(t)$ represents the alloted traffic which a cell is prepared to service at time t, where i and j identify a particular cell. For example, i is desirably the cell number within an orbital plane and j is the orbital plane number. The number of orbital planes and cells within a plane are not important to the present invention. Thus, $$K_{ij}(t) = \bar{x} + a\sigma_x = \sum_{l=1}^{L} \rho_l + a\sqrt{\sum_{l=1}^{L} \rho_l} \quad \text{(Eqn. 13)}$$

where "a" is an arbitrary number. The generate traffic model process then exits in step 128.

Figure 8:
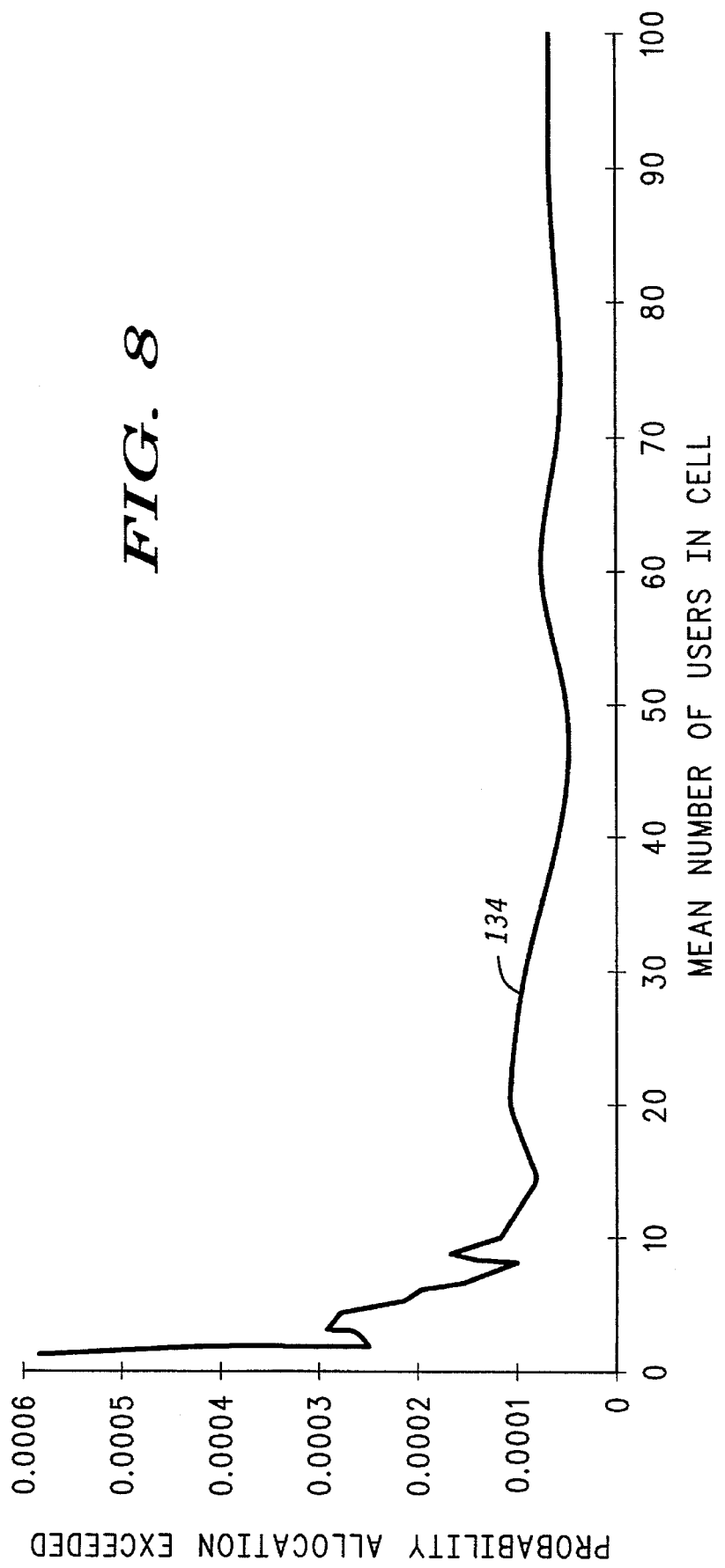
FIG. 8 illustrates a graph of the number of users in a cell versus the probability of exceeding an allocation determined in accordance with a preferred embodiment of the present invention.

FIG. 8 illustrates a graph of the number of users in a cell versus the probability of exceeding $K_{ij}$, determined in accordance with a preferred embodiment of the present invention. A value of 4 was used for "a" in Eqn. 13. The graph 134 shows the probability that the number of users in a cell exceed $K_{ij}$ for values of $$1 \leq \sum_{l=1}^{L} \rho_l(t,\theta_l,\phi_l) \leq 100$$

The graph 134 shows that the probability of exceeding $K_{ij}$ is less than $10^{-3}$. Thus, the invention provides statistically robust traffic.

In summary, an improved method and apparatus for modeling traffic within a communication system has been described which overcomes specific problems and accomplishes certain advantages relative to prior art methods and mechanisms. The method and apparatus provide for robust and computationally simple predictions of subscriber traffic for satellite systems where such predictions are critical for acceptable management of limited system resources.

While a preferred embodiment has been described in terms of a satellite cellular telecommunications system and method, those of skill in the art will understand, based on the description, that the system and method of the present invention are not limited to satellite cellular systems, but may apply equally well to other types of multi-nodal telecommunications systems whose resource management is important. For example, the system and method of the present invention may apply to a trunking radio system which time shares radio channels.

What is claimed is:

1. A method for using a statistically robust traffic model to control access of communication units to communication channels in a communication system comprising the steps of:

a) dividing a surface into elemental areas, on which surface the communication units emanate signals, wherein an elemental area is defined by a geographical region, and an area defined by a cell comprises a set of elemental areas;

b) collecting traffic data describing past and present communication channel usage by the communication units located in the set of elemental areas;

c) generating a statistically robust traffic model based on the traffic data within the set of elemental areas by combining the traffic data of elemental areas comprising the cell;

d) determining channel allocations based on the statistically robust traffic model; and e) allowing access to the communication channels based on the channel allocations determined using the statistically robust traffic model.

2. The method as claimed in claim 1, wherein step b) comprises the steps of:

b1) determining call attempts during a particular time interval;

b2) determining the elemental areas in which the communication units making the call attempts are located; and b3) collecting the traffic data as a totality of the call attempts for each of the elemental areas during the particular time interval.

3. The method as claimed in claim 1, wherein step c) comprises the steps of:

c1) determining past numbers of calls within the elemental areas during past time increments based on the traffic data;

c2) associating locations of cells at future times with sets of the elemental areas;

c3) predicting estimates of future numbers of calls based on the past numbers of calls and the locations of cells; and c4) generating the statistically robust traffic model based on the estimates of future numbers of calls.

4. The method as claimed in claim 3, wherein the communication system comprises satellites which project the cells which can be divided into time-dependent sets of elemental areas onto the surface, the method further comprising the step of transmitting the channel allocations to the satellites.

5. The method as claimed in claim 1, wherein the communication system comprises satellites which project cells which can be divided into time-dependent sets of elemental areas onto the surface, and wherein step e) comprises the steps of:

e1) transmitting the channel allocations to the satellites; and e2) allowing the communication units to use the communication channels provided in the cells up to a number not exceeding the channel allocations.

6. A method for using a statistically robust traffic model for controlling access of communication units to communication channels in a communication system comprising the steps of:

a) dividing a surface into elemental areas, on which surface the communication units emanate signals, b) collecting traffic data describing past communication channel usage by the communication units located in the elemental areas;

c) generating a traffic model based on the traffic data by determining past numbers of calls within the elemental areas during past time increments based on the traffic data, associating locations of cells at future times with future sets of the elemental areas, predicting estimates of future numbers of calls based on the past numbers of calls and the past locations of cells by computing a mean number of calls using a first equation:

$$\sum_{l=1}^{L} \rho_l,$$

where L is a limit and $\rho_l$ is a call arrival rate divided by a service rate, and generating the statistically robust traffic model based on the estimates of future numbers of calls;

d) determining channel allocations based on the statistically robust traffic model; and e) allowing access to the communication channels based on the channel allocations determined using the statistically robust traffic model.

7. The method as claimed in claim 6, wherein step d) comprises the steps of:

d1) computing a standard deviation of the mean number of calls using a second equation:

$$\sqrt{\sum_{l=1}^{L} \rho_l} \ ;$$

and d2) determining the channel allocations using a third equation:

$$\sum_{l=1}^{L} \rho_l + a\sqrt{\sum_{l=1}^{L} \rho_l} \ ,$$

where "a" is an arbitrary number.

8. A method for using a statistically robust traffic model to control access of communication units to communication channels performed by a satellite comprising the steps of:

a) receiving channel allocations from a control facility which have been calculated by dividing a surface into elemental areas, on which surface the communication units emanate signals, wherein an elemental area is a geographical area and a cell comprises a set of the elemental areas, collecting traffic data describing past communication channel usage by the communication units located in the elemental areas, generating a statistically robust traffic model for a future time interval based on the traffic data, and determining the channel allocations based on the statistically robust traffic model;

b) storing the channel allocations; and c) allowing the communication units to use the communication channels up to the channel allocations during the future time interval.

9. A method of accessing communication channels performed by a communication unit in a communication system comprising the steps of:

a) attempting to use a communication channel provided by a satellite; and b) using the communication channel when use would not exceed channel allocations stored in the satellite, where the channel allocations are calculated by dividing a surface into elemental areas, on which surface the communication units emanate signals, wherein an elemental area is a geographical area and a cell comprises a set of the elemental areas, collecting traffic data describing past communication channel usage by the communication units which have been positioned in an elemental area, generating a statistically robust traffic model for a future time interval based on the traffic data, and determining the channel allocations using the statistically robust traffic model.

10. The method as claimed in claim 9 further comprising the step of transmitting location information which positions the communication unit in an elemental area to the satellite when an attempt to use the communication channel has been made.

11. A method for using a statistically robust traffic model to control access of communication units to communication channels in a communication system, the method performed by a control facility and comprising the steps of:

a) dividing a surface into elemental areas, on which surface the communication units emanate signals, wherein a cell comprises a set of the elemental areas and an elemental area is a geographic area on the surface;

b) collecting traffic data describing past communication channel usage by the communication units located in the elemental areas;

c) generating a traffic model based on the traffic data;

d) determining channel allocations based on the traffic model; and e) transmitting the channel allocations to satellites which provide the communication channels and allow access to the communication channels based on the channel allocations.

12. A satellite comprising:

a down-link receiver for receiving channel allocations which have been calculated by dividing a surface into elemental areas, on which surface the communication units emanate signals, wherein a cell comprises a set of the elemental areas and an elemental area is a geographic area on the surface, collecting traffic data describing past communication channel usage by the communication units located in the elemental areas, generating a statistically robust traffic model for a future time interval based on the traffic data, and determining the channel allocations based on the statistically robust traffic model;

a controller coupled to the down-link receiver for conforming access to communication channels according to the channel allocations during the future time interval;

a transmitter coupled to the controller for providing the communication channels to the communication units; and a memory device coupled to the controller for storing the channel allocations.

13. A communication unit comprising:

a processor for attempting to use a communication channel provided by a satellite, and using the communication channel when use would not exceed channel allocations stored in the satellite, where the channel allocations have been calculated by dividing a surface into elemental areas, on which surface the communication units emanate signals, wherein a cell comprises a set of the elemental areas and an elemental area is a geographic area on the surface, collecting traffic data describing past communication channel usage by the communication units located in the elemental areas, generating a traffic model for a future time interval based on the traffic data, and determining the channel allocations based on the traffic model; and a transmitter coupled to the processor for transmitting location information to the satellite which is accurate enough to position the communication unit within an elemental area when an attempt to use the communication channel has been made.

14. A control facility comprising:

a controller for dividing a surface into elemental areas, on which surface the communication units emanate signals, wherein a cell comprises a set of the elemental areas and an elemental area is a geographic area on the surface, for collecting traffic data describing past communication channel usage by the communication units located in the elemental areas, for generating a statistically robust traffic model based on the traffic data from the set of elemental areas, and for determining channel allocations based on the statistically robust traffic model; and an interface unit coupled to the controller for transmitting the channel allocations to satellites.

* * * * *